Patented Feb. 10, 1931

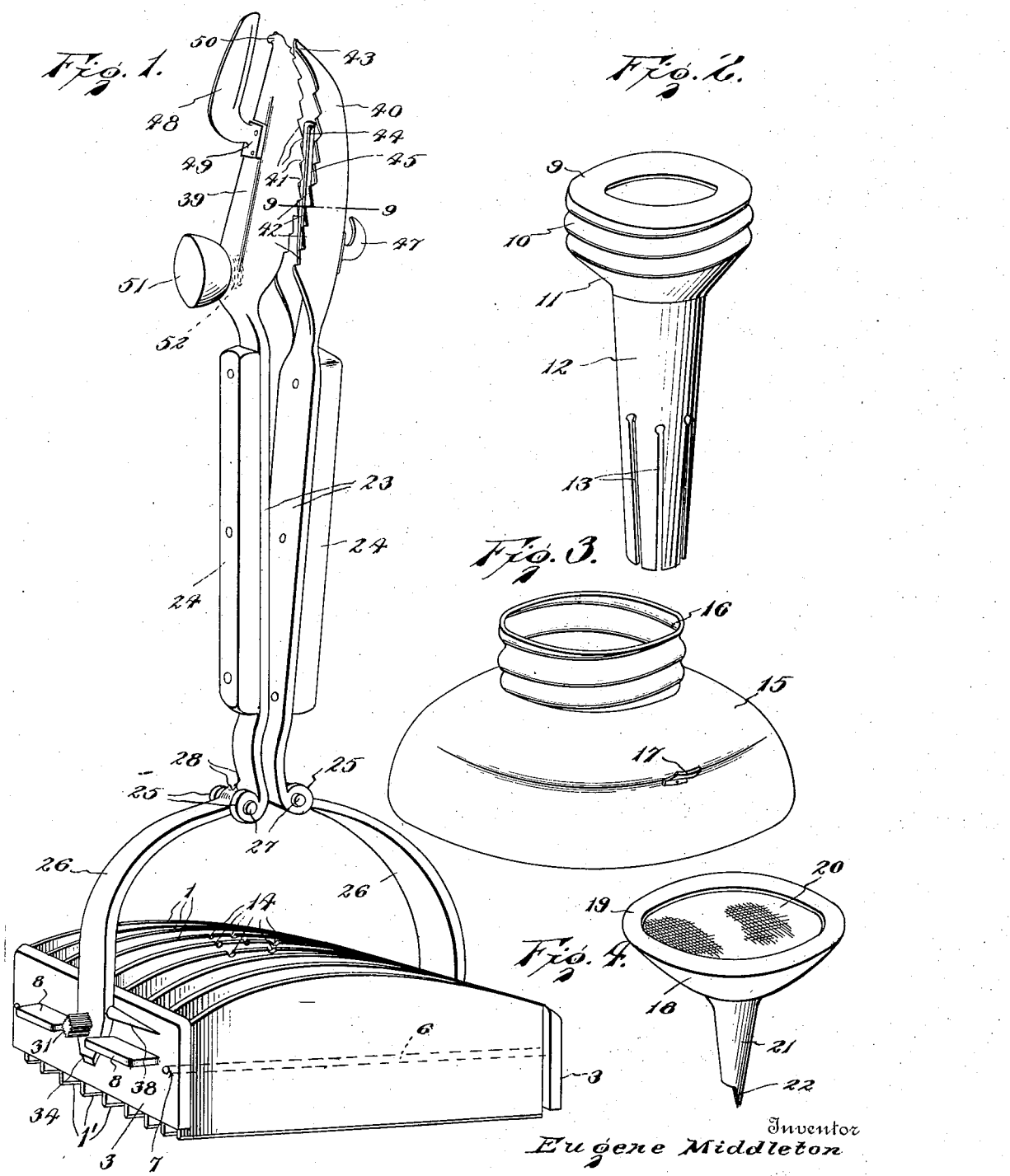

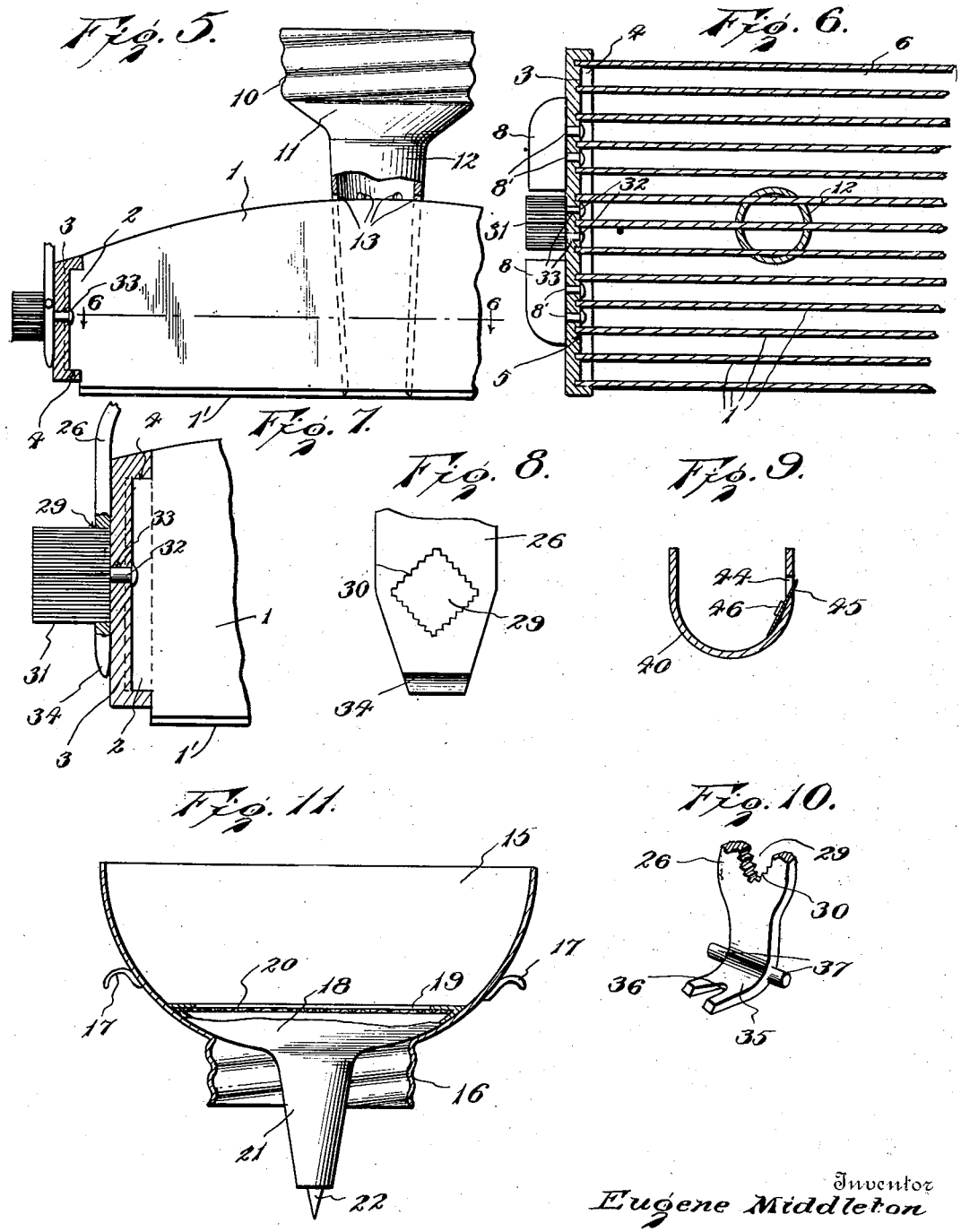

1,791,826

UNITED STATES PATENT OFFICE

EUGENE MIDDLETON, OF SALT LAKE CITY, UTAH

KITCHEN IMPLEMENT

Application filed June 8, 1929. Serial No. 369,516.

This invention relates to kitchen implements and more particularly to a combination implement having a large number of uses, thereby providing an implement which will take the place of a large number of implements used in a kitchen.

One object of the invention is to provide a kitchen implement which may be used for carrying out a number of operations ordinar10 ily performed while preparing a meal and which is so constructed that it will be very easy to handle.

Another object of the invention is to so form the implement that it may be used for a number of purposes in a home other than are necessary during preparation of a meal and thereby provide a tool of general utility.

Another object of the invention is to provide a tool or implement of this character which may be successfully used as a chopper, mincer, and slicer of fruits, nuts, and vegetables; as a means whereby dough may be cut into strips for noodles and other dough products; as a blender of dough in making pastry, and by inversion and suitable adjustment of the gripping handles, as a means for mashing potatoes and other foods or for pressing various fruits and vegetables in making jams, jellies, catsups and so forth, and also as a pounder to tender meat.

Another object of the invention is to provide a means whereby the core alone may be removed from an apple, or a core be removed and at the same time the apple reduced to small slices of an even thickness.

Another object of the invention is to provide the combined slicer and pounder with handles by means of which it may be easily held when in use and which handles may be detached and used for other purposes.

Another object of the invention is to provide an implement having special readily detachable and demountable handle-pieces capable of fulfilling a large number of purposes aside from their use as a complementary handle or grip for the combination, it being possible to pare fruits and vegetables, handle various hot objects about a kitchen, remove or tighten screw-cap bottle lids of all sizes, scale fish, open cans or punch holes in the heads of milk cans, remove caps on bottles or the so-called anchor-type jar lids, crack nuts or drive tacks, remove corks from bottles or seeds from grapefruit or eyes or bad spots from potatoes or fresh pineapple, drive screws, split ice, pry off compression lids, ream symmetrical holes through leather or other tough material, pull tacks and lift stove lids with these handle-pieces in various states of combination and detachment.

Another object of the invention is to provide the combined slicer and pounder with an attachment adapted to remove a core from an apple while slicing an apple and allow this attachment to be firmly but releasably applied to the combined slicer and pounder.

Another object of the invention is to so form the apple coring attachment that it may be removably applied to a cup-shaped element to be used as a small cake and biscuit cutter with said attachment as the handle thereof.

Another object of the invention is to so form the cup-shaped element that it may be variously used, either singly or in combination with other pieces of the combination, as a large-necked fruit jar funnel-filler, a small strainer, a different style funnel for filling narrow-necked bottles, and a convenient cutter for small cakes and biscuits, as mentioned.

Another object of the invention is to provide a strainer which may be suitably deposited in the cup-shaped element or funnel-body, constituting it a cup strainer or a funnel suitable for filling narrow-necked bottles, and to so form the spout of the said strainer element that its small depending spur or spear point may be used to remove the caps found on milk bottles.

The invention is illustrated in the accompanying drawings, wherein

Figure 1 is a perspective view of the improved implement assembled for use, in this view, as a food slicer or chopper, Figure 2 is a perspective view of an attachment by means of which a core can be removed from an apple while the apple is left otherwise whole or, in use with the bladed piece or member of the outfit, sliced too, as desired, and which may also constitute a handle for the small cookie, doughnut and biscuit cutter, provided,

Figure 3 is a perspective view of the bowl portion of a funnel which also constitutes a piece of the small cake and biscuit cutter, Figure 4 is a perspective view of an element to be fitted into the bowl shown in Figure 3 and constitutes a small strainer, a reduced spout for the funnel-body, and also a handy little tool whereby the caps on milk bottles may be removed, Figure 5 is a fragmentary sectional view taken through the combined slicer and pounder with the core-removing device set in place, Figure 6 is a transverse sectional view taken on the line 6—6 of Fig. 5, Figure 7 is a fragmentary sectional view through one side portion of the combined slicer and pounder, Figure 8 is a fragmentary view of an end portion of one of the handle-carrying arms or shanks of the pounder, Figure 9 is a transverse sectional view taken on the line 9—9 of Fig. 1, Figure 10 is a perspective view of the lower end portion of the other handle-carrying arm, and Figure 11 is a sectional view of the device shown in Fig. 3 when used as a funnel with the device shown in Fig. 4 set in place.

The combined masher-pounder and fruit, nut and vegetable chopper and slicer forming part of the improved implement includes a number of blades 1 which are shaped as shown in Fig. 1 and have sharpened lower edges 1'. Any number of blades may be provided. Each blade has its end portions reduced to form a tongue 2 at each end of the blade and against the ends of the blades are disposed plates 3 formed of stiff metal and having their inner faces recessed, as shown at 4, to receive the tongues of the blades and also provided with grooves 5 opening into the recesses 4 and constituting seats into which the tongues are fitted, as shown in Figs. 5, 6 and 7. Therefore, the blades will be retained in spaced relation to each other when the plates are applied to the blades and secured by rods 6 which extend between the plates with their ends engaged in openings 7 formed therein. By this arrangement the blades and plates will be firmly held together but by removing the rods they will be released and allowed to be thoroughly cleaned when necessary; also, if desired, a small inexpensive appliance, provided with bristles and of rake-tooth construction might be manufactured to accompany the outfit for cleaning purposes. Finger holds 8 project from the outer faces of the plates 3 in spaced relation to each other so that the slicer may be easily grasped if it is desired to use the same without a handle and these finger pieces are secured by pins 8' which pass through the plates and are preferably formed with heads at their inner ends, as shown in Fig. 6.

When slicing potatoes, the device is grasped by the finger holds and pressed downwardly through a potato in order to cut it into slices of an even thickness but when slicing an apple it is desired to have a core removed, and in order to allow the core to be removed at the same time an apple is cut into slices, there has been provided an appliance shown in Fig. 2 and adapted to be applied to the slicer, as shown in Figs. 5 and 6. This attachment is formed of metal and consists of a head 9 having annular walls 10 which are threaded and a tapered lower portion 11 which merges into a hollow neck 12. The neck 12 tapers toward its lower end and its lower portion is formed with longitudinally extending slots 13 disposed in such spaced relation to each other circumferentially of the neck that when the coring attachment is applied to the slicer the blades will be received in the slots 13. Notches 14 are formed in the upper edges of the central or intermediate blades, as shown in Fig. 1, so that when the attachment is thrust firmly into place portions of the neck at the upper ends of the slots will be engaged in these notches. The presence of these notches will also improve the device when used as a pounder to tender meat. Since the head 9 is partly closed at its upper end, thumbs may bear against the head when the finger holds 8 are engaged by a person's fingers and pressure exerted against the upper end of the coring device and thereby allow the coring device and slicer to be easily pressed downwardly through an apple in order to cut the apple into slices and at the same time remove a core. After each operation, the coring attachment may be lifted from the blades and the retained core easily thrust out with a finger. If desired to merely core apples and keep them otherwise whole, the attachment, being readily separable from the rest of the combination, will be found useful for this purpose, also.

The coring device not only serves as an implement by means of which a core may be easily removed but may also be used as a handle for a biscuit and doughnut cutter constructed as shown in Fig. 3. This cutter consists of a cup 15 formed of metal and having a threaded neck 16 of such diameter that the head of the coring device may be screwed into the neck 16. Therefore, the cup 15 may be easily held and dough cut out into circular pieces in order to form biscuits, cookies or doughnuts. If doughnuts are desired, after a strip of dough has been cut by means of the cutter a center opening can be formed either by the open end of the neck 12 or by removing the coring device and cutting a center opening with the neck 16. This neck 16 might also be used to form disks of dough of smaller diameter.

The doughnut and biscuit cutter may also be used as a funnel by inverting it, as shown in Fig. 11. When in this position, the cup 15 constitutes the body portion of a funnel and the neck 16 may be screwed onto the neck of a small fruit jar. If the funnel is to be used for filling a jar having a large neck, it may be supported in the neck by side ears 17 which not only serve to support the funnel but also serve to retain the funnel spaced from the neck of the jar for the greater portion of its circumference and thereby provide space between the funnel and the neck of the jar through which air may pass as the jar is filled. It is often desired to strain liquid which is being poured into a jar through the funnel, and in order to do so, there has been provided a strainer constructed, as shown in Fig. 4, and adapted to fit into the cup 15, as shown in Fig. 11. This strainer consists of a shallow bowl 18 of such curvature that it will fit in close contacting engagement with the lower portion of the cup or bowl 15. The inwardly extending annular flange 19 is provided about the upper portion of the bowl 18 to retain a sheet of screening 20 in place and from the bowl 18 extends a neck 21 which tapers downwardly and is open at its lower end. The device shown in Fig. 4 may be applied to the bowl 15 when filling bottles having small necks, straining fruit juice into a cup or bowl, and so forth. A portion of the neck 21 is extended to form a depending spur 22 by means of which the cardboard caps found on milk bottles may be removed when the device shown in Fig. 4 is held in one hand. It will, therefore, be seen that the device shown in Fig. 4 may serve not only as a strainer and a funnel neck but also as a device to remove the caps on milk bottles. If desired to form this appliance of strong metal, its spear point might also be used for other purposes as well, such as puncturing the head of a can holding evaporated milk or the like, though this little service is nominally served by the point of the can-opening blade, found on another piece of the outfit.

In order to hold the bladed member when using it to pound a steak which is to be tendered or to slice or chop foods, and so forth, there has been provided handles 23 formed of metal and having facing strips 24 applied thereto so that the handles may be firmly grasped without cutting a person's hands. These handles terminate in hinge ears 25 between which are pivotally mounted the upper ends of arms or shanks 26 also formed of metal. Each arm is pivotally connected with its handle by a pivot pin 27 which is readily removable and its upper end terminates in spurs 28 adapted to bear against the handle to which the arm is pivoted so that pivotal movement of the handles in one direction will be limited. Each arm is formed adjacent its free lower end with a rectangular opening 29 having serrated edges 30 to receive ribs formed along the side faces of knobs or blocks 31 projecting from the plates and which knobs or blocks are held in engagement with the plates by pins 32 received in openings 33. The knobs provide mountings for the lower ends of the arms 26 and since they are square in cross section the arms will be prevented from turning about the knobs. The ribs formed upon the knobs and engaged with the serrated edges of the openings 29 prevent the arms from slipping easily along the knobs and becoming detached therefrom. The free end of one arm is formed to provide a screw driver, a piece which might be detached and used for splitting ice, and an occasional prying instrument, for removing a type of compression lids found on cans, as shown at 34, and the free end of the other arm terminates in a curved extension 35 notched, as shown at 36, so that it may be used as a tack puller. It should also be noted that this extension is provided with side pins 37, thereby allowing the arm to be used as a lifter for stove lids. A prong 38 projects transversely from the arm terminating in the screw driver and constitutes an awl which may be used for forming holes in leather, although the awl may be used for forming holes in other materials or for punching holes in the head of a can.

The free ends of the handles 23 terminate in heads 39 and 40 each of which is U-shaped in cross section to provide side walls. The walls of the head 39 terminate in arcuate edges which are curved outwardly and formed with teeth 41 facing the inner end of the head and the head 40 has its walls terminating in arcuate edges which are curved inwardly and formed with teeth 42 facing the outer or free end of the head. As the teeth of the head 39 face in an opposite direction to the teeth of the head 40, the handles bearing them, when suitably handled and manipulated, constitute a pair of kitchen tongs useful in attending to boiled eggs, baked potatoes, boiled corn on the cob, heated utensils, fruit bottles from their bath in boiling water, and other hot objects about a kitchen. The handles also constitute a wrench by means of which a fruit jar cap may be firmly gripped between the heads and screwed tightly into place or easily released from its jar, and the handle bearing the outwardly arcuate teeth-edges may be detached and used as an implement for scaling fish. The head 40 terminates in a sharp point 43 at its free end so that this head may be used for removing corks from bottles, grapefruit seeds, and eyes or bad spots from potatoes and fresh pineapple, and in order to allow this head to be also used for paring potatoes and other fruits and vegetables, there has been provided in one wall a longitudinally extending slot 44 through which extends a blade 45. The blade 45 resembles a blade of the type used in safety razors and is held in place by tongues 46 struck from the walls of the head adjacent the ends of the slot 44 and facing each other so that they will overlap end portions of the blade. If this blade is made easily removable, it may be set in place when paring is to be done but it may be removed in order to prevent danger of cutting a person's hands at other times. A jar lid and bottle cap remover 47 is applied to the head 40 and firmly secured thereto by rivets or in any other desired manner. There has also been provided a can opening blade 48 which extends longitudinally of the head 39 and is secured thereto, as shown at 49, and the free end of the head 39 is bent to form a spur 50 extending toward the can opener blade and adapted to bite into a can while the head of the can is being cut. The point of this can opener blade is particularly intended, too, as a means to perforate the heads of milk cans, although other parts of the combination might be employed for such a purpose, as previously mentioned. There has also been provided a block 51 having a threaded shank 52 screwed into an opening formed in the head 39 near its rear end. This block is formed of solid metal and when in place may be used for driving tacks, cracking nuts, and other small hammer work.

I have, therefore, provided an implement which may be used for many purposes in a kitchen and will be found very convenient about a home or restaurant.

Having thus described the invention, I claim:

1. A kitchen implement comprising a head including blades spaced transversely from each other, plates extending across the ends of said blades and having firm engagement with the ends thereof, finger holds projecting from said plates, a removable pressure device having a head and a tubular shank extending downwardly therefrom and adapted to be passed downwardly through the cutting head, said shank being formed with slots to receive said blades, and a cup constituting a biscuit and doughnut cutter and having a neck adapted to removably receive the head of the pressure device whereby the pressure device may serve as a handle for the same.

2. A kitchen implement comprising a head including blades spaced transversely from each other, plates extending across the ends of said blades and having firm engagement with the ends thereof, finger holds projecting from said plates, a removable pressure device having a head and a tubular shank extending downwardly therefrom and adapted to be passed downwardly through the cutting head, said shank being formed with slots to receive said blades, a cup constituting a biscuit and doughnut cutter and having a neck adapted to removably receive the head of the pressure device whereby the pressure device may serve as a handle for the same, the said cup being also adapted to serve as a funnel body, and a strainer adapted to be set into the cup and having a neck to extend downwardly therefrom which neck constitutes a funnel spout and is formed with a depending spur at its end adapting the piece for use in removing caps of milk bottles.

3. A kitchen implement comprising a head including blades spaced transversely from each other, plates extending across the ends of said blades and having firm engagement with the ends thereof, arms removably connected with said plates and extending upwardly therefrom, handles removably carried by said arms, arm and handle supporting knobs or blocks projecting from the outer faces of the plates, whereby the head may be inverted to accomplish various sorts of work, finger holds projecting from the outer faces of the plates, a pressure device possessing a head and tubular shank which may be used for coring apples separately from the rest of the combination but which is designed and particularly adapted to be passed downwardly through the cutting head for simultaneous coring and slicing, said shank of said pressure device being formed with slots to receive said blades, a cup constituting a small cake and biscuit cutter and having a neck adapted to removably receive the head of the pressure device whereby the pressure device may serve as a handle for the same, the said cup also being adapted to serve as a funnel body, and a strainer adapted to be set into the funnel body and bearing a tubular spout formed with a small spear point at its free end employable in removing the caps on milk bottles.

In testimony whereof I affix my signature.

EUGENE MIDDLETON. [L. S.]